UNITED STATES PATENT OFFICE.

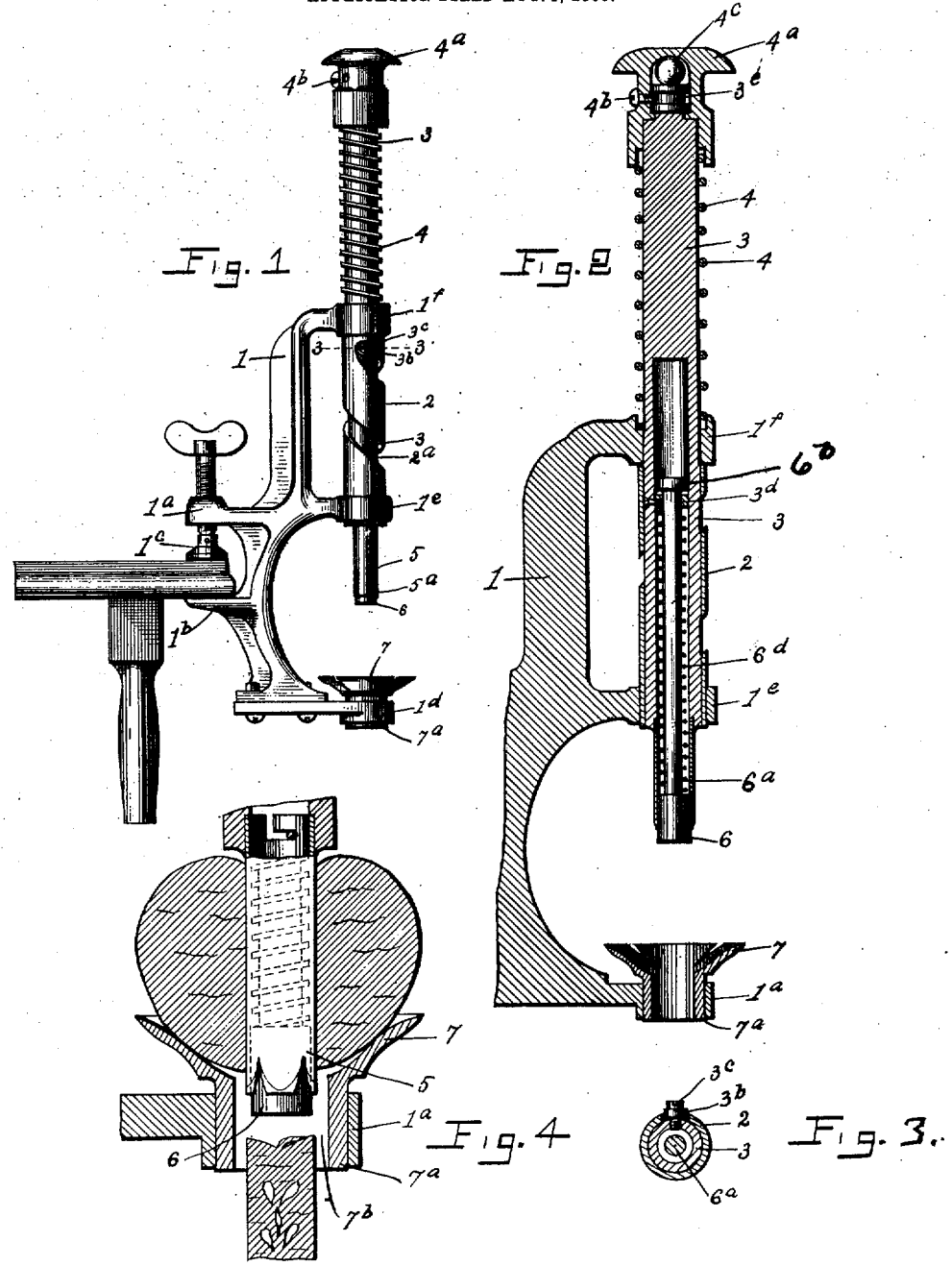

JOHN BAKER, OF HOOPESTON, ILLINOIS.

FRUIT AND VEGETABLE CORER.

No. 857,512.    Specification of Letters Patent.    Patented June 18, 1907.

Application filed August 8, 1906. Serial No. 329,787.

*To all whom it may concern:*

Be it known that I, JOHN BAKER, of Hoopeston, in the State of Illinois, have invented certain new and useful Improvements in Fruit and Vegetable Corers; and I hereby declare that the following is a full, clear, and exact description thereof, reference being had to the accompanying drawings, which form part of this specification.

This invention is an improved machine for coring tomatoes, apples, and other fruits and vegetables.

The object of the invention is to provide a corer in which the fruit can be held stationary while the cutter removes the core; and to make the cutter rotate while coring so that the fruit will not be mashed or squeezed,—thereby saving loss of the fruit juices; and to provide an ejector by which the core will be snapped out of the corer tube, so that the machine can be operated rapidly.

The drawings illustrate an efficient form of the machine to be operated by hand, and the essential features and combinations of parts for which protection is desired are summarized in the claims following the description of such machine.

In said drawings—Figure 1 is a side view of the complete corer in position for use. Fig. 2 is a vertical sectional view through the operative parts. Fig. 3 is a transverse section on line 3—3, Fig. 1; and Fig. 4 is a detail sectional view of the fruit-holder, showing the cutter and ejector in position after having cored the fruit.

The machine comprises a standard or body portion 1 having clamp lugs $1^a$, $1^b$, through one of which is passed a clamping bolt $1^c$ by which the standard can be readily secured to the edge of a table or other convenient support. The body is provided with vertically alined horizontally disposed rings $1^d$, $1^e$, $1^f$; to and between the two upper rings $1^e$, $1^f$, is fastened a cylindrical guide 2 which is non-rotatable, and is provided with a spiral guide slot $2^a$, engaged by a roller $3^b$ on a pin $3^c$ attached to the side of a plunger 3, which is guided in 2, and can be reciprocated therein, and, as shown, is normally uplifted by a helical-spring 4 interposed between the upper ring $1^f$, and a knob $4^a$ on the upper end of plunger 3. The knob $4^a$ is preferably rotatably connected to the plunger 3 by pins $4^b$ engaging an annular groove in the reduced upper end $3^e$ of the plunger, as shown; and a ball-bearing $4^c$ may be interposed between the top of the plunger and the knob, so as to permit the plunger to easily rotate as it descends without rotating the knob. The plunger is adapted to be forced down by striking the knob with the hand, and obviously as the plunger moves endwise, it is caused to rotate on its axis by the engagement of roller $3^b$ with groove $2^a$.

To the lower end of the plunger is attached a tubular cutter 5 which may be connected to the plunger in any suitable manner so as to be kept in axial alinement therewith; a pin-and-key-slot connection is shown in the drawings, but any other suitable connection may be used, so that the cutter can be detached for repairs. The cutter preferably has its lower cutting edge notched or serrated, as shown at $5^a$, so that it will shear the fruit as it rotates instead of making a mere direct chisel cut,—and by thus rotating the cutter the fruit may be held stationary thereunder and yet will not be mashed or squeezed to any detrimental extent while being cut.

Within the cutter is an ejector 6 which is fast to the lower end of an ejector-rod $6^a$ guided in a contraction or collar $3^d$ secured within the plunger, and having a retaining ring $6^d$ on its upper end above the collar $3^d$. A helical spring $6^d$ is interposed between the ejector 6 and the collar $3^d$ to hold the ejector in the mouth of the core with yielding pressure.

On the lower ring $1^d$ is supported a fruit holder 7 which is preferably saucer-shaped, and provided with a depending hollow shank $7^a$, fitted into ring $1^d$, the opening $7^b$ in the shank being slightly larger in diameter than the cutter 5, so that after a core has been severed from the fruit the ejector can force it out through the opening $7^b$ in the holder.

The operation of the device is quite simple. The spring 4 normally holds the plunger, with cutter and ejector, in elevated position; the operator takes the fruit or vegetable to be cored and places it on the holder 7, with its stem uppermost, its core vertical and directly over the opening $7^b$. Then the plunger is forced downward by a smart blow or steady pressure, as preferred, and the cutter descends onto the fruit, and cuts a circular core therefrom, the cutting action being enhanced by the rotative action of the saw. As the cutter descends the ejector 6 impinges upon the fruit and is momentarily arrested, the spring 6^d being put under compression, but when the cutter has about completed its work, the spring 6^d causes the ejector to force the core through the opening 7^b by a snap action, and then the plunger is released and the cutter and ejector are raised with the plunger by the action of spring 4.

The operator can hold the fruit on the support 7 with one hand while depressing the plunger, can pick up a fruit, place it on the support, core it and remove it from the support without relaxing his grasp on the fruit, and can thus operate the corer very rapidly. The fruit does not have to be impaled on any holder, or prongs, nor rotated during the coring operation, and the fruit juices are not wasted; but the cutter rotates as it descends and will not crush or squeeze soft fruits, and this facilitates the cutting operation on hard fruits. The device is especially adapted for canneries, as well as for household use.

Having described my invention what I claim as new and desire to secure by Letters Patent is:

1. In a coring machine, the combination of a frame adapted to be mounted on a support, a fixed spirally slotted guide fixed in said frame, a plunger mounted to reciprocate and rotate in said guide, a spring for retracting the plunger, a pin on the plunger engaging the spiral slot in the guide, a cutter surrounding the ejector, a yielding spring pressed ejector within the cutter and a fruit support attached to the frame below the plunger, substantially as described.

2. In a coring machine, the combination of a frame adapted to be attached to a table, a vertical spirally slotted guide fixedly attached to said frame, a reciprocating and rotatable plunger mounted in said guide, a spring above the guide for retracting the plunger, a pin on the plunger engaging the spiral slot to cause the plunger to rotate as it is reciprocated, a spring pressed ejector within the plunger in the guide, a cutter surrounding and normally retracted above the ejector, and a fruit support on the frame below the cutter having a core-opening, substantially as described.

3. In a corer, the combination of a frame, adapted to be attached to a table, a spirally grooved guide fixedly secured thereto, a fruit support below the guide having a core-outlet opening, a reciprocatory and rotatable plunger mounted in said guide, a pin on the plunger engaging the spiral groove of the guide, a rotatable knob on the upper end of the plunger, a spring interposed between the knob and upper end of the guide, a tubular cutter attached to the lower end of the plunger, an ejector in the cutter, an ejector-rod within the plunger, and an ejector-spring within the plunger, all substantially as described.

In testimony that I claim the foregoing as my own, I affix my signature in presence of two witnesses.

JOHN BAKER.

In presence of—
M. J. HAWKINS,
P. D. HART.